(12) United States Patent
Berret et al.

(10) Patent No.: US 7,868,076 B2
(45) Date of Patent: Jan. 11, 2011

(54) AQUEOUS PAINT COMPOSITIONS COMPRISING A COLLOIDAL DISPERSION OF CERIUM

(75) Inventors: Jean-François Berret, Chaville (FR); Mikel Morvan, Aigremont (FR); Amit Sehgal, Marlton, NJ (US)

(73) Assignee: Rhodia Chimie, Aubervilliers (FR)

( * ) Notice: Subject to any disclaimer, the term of this patent is extended or adjusted under 35 U.S.C. 154(b) by 317 days.

(21) Appl. No.: 11/887,906

(22) PCT Filed: Jan. 5, 2006

(86) PCT No.: PCT/FR2006/000018

§ 371 (c)(1),
(2), (4) Date: Oct. 16, 2008

(87) PCT Pub. No.: WO2006/072743

PCT Pub. Date: Jul. 13, 2006

(65) Prior Publication Data

US 2009/0163639 A1 Jun. 25, 2009

Related U.S. Application Data

(60) Provisional application No. 60/642,458, filed on Jan. 7, 2005.

(51) Int. Cl.
*C08K 3/10* (2006.01)
*C08K 3/08* (2006.01)

(52) U.S. Cl. ........................ 524/403; 524/440

(58) Field of Classification Search .................. 524/403
See application file for complete search history.

(56) References Cited

U.S. PATENT DOCUMENTS

| | | | |
|---|---|---|---|
| 4,138,381 A | 2/1979 | Chang et al. | |
| 4,384,096 A | 5/1983 | Sonnabend | |
| 4,545,923 A | 10/1985 | Gradeff et al. | |
| 5,344,588 A | 9/1994 | Chane-Ching | |
| 7,101,931 B2 * | 9/2006 | Lannibois-Drean et al. | 524/801 |
| 7,462,665 B2 * | 12/2008 | Bousseau et al. | 524/403 |
| 7,495,033 B1 | 2/2009 | Chane-Ching | |

FOREIGN PATENT DOCUMENTS

| | | |
|---|---|---|
| EP | 0705854 A1 | 4/1996 |
| FR | 2836479 | 8/2003 |
| FR | 2840313 | 12/2003 |
| WO | WO 01/38225 A1 | 5/2001 |
| WO | WO 03/099942 A1 | 12/2003 |

OTHER PUBLICATIONS

International Search Report dated Jul. 12, 2006 for International Application No. PCT/FR2006/000018.
Written Opinion dated Jul. 12, 2006 for International Application No. PCT/FR2006/000018.

* cited by examiner

*Primary Examiner*—Ling-Siu Choi
*Assistant Examiner*—Hui Chin
(74) *Attorney, Agent, or Firm*—Buchanan, Ingersoll & Rooney PC

(57) ABSTRACT

The instant invention relates to an aqueous paint composition comprising a mixture of: (1) an aqueous paint; (2) a colloidal dispersion of a cerium compound, said dispersion having a pH of at least 5, and comprising a water-soluble or water-dispersible polymer (i) obtained by polymerizing at least one monomer (I), corresponding to the following: (I): ethylenically unsaturated, linear or branched, aliphatic, cyclic or aromatic monocarboxylic or polycarboxylic acid, or anhydride; and, optionally, a monomer corresponding to II): a polyoxyalkylenated ester of an ethylenically unsaturated carboxylic acid; and (3) a base.

The instant invention also relates to paints and varnishes containing said composition.

23 Claims, 2 Drawing Sheets

AQUEOUS PAINT COMPOSITIONS COMPRISING A COLLOIDAL DISPERSION OF CERIUM

This is a 371 application of International Application No. PCT/FR2006/00018, filed Jan. 5, 2006, which claims priority to U.S. Provisional Application Ser. No. 60/642,458, filed Jan. 7, 2005, all of which are incorporated herein by reference.

The invention relates to aqueous paint compositions containing a colloidal dispersion of cerium, their method of preparation and their use.

Paint compositions formulated with a colloidal dispersion of cerium present an inherent difficulty due to the instability of the bare inorganic nanoparticle sols at a pH around 3 and above.

WO 03/099942 teaches a process for the stabilization of aqueous paint compositions comprising of colloidal cerium at neutral pH. The nanoparticles of cerium serve as non-leachable, non degradable, clear inorganic UV-absorbers in the coating. They also present other additional benefits as increased resistance to water and improved mechanical strength of the coating.

The cerium colloidal dispersions are stabilized in the paint compositions in WO 03/099942 by adding an acidic complexing agent with three or more functional groups, more particularly citric acid. The outlined process is very efficient in extending the pH range of stable cerium dispersions at a pH of 7 and above that allows their use in some coating applications. However, the stabilized colloidal cerium may present an evolution in color to a dark brownish dispersion when proper precautions are not taken and the sol is stored exposed to light in the visible wave length range and to UV radiation.

One of the goals of the instant invention is to provide aqueous paint compositions comprising a colloidal dispersion of cerium which are stable and which do not become colored upon storage upon exposure to light and/or UV. The stability referred to above as a goal, means that there is no visible change in pigmentation and no precipitation observable by the eye over time. These objectives and others which will appear in what follows are achieved by means of an aqueous paint composition comprising a mixture of:

(1) an aqueous paint;
(2) a colloidal dispersion of a cerium compound comprising a water-soluble or water-dispersible polymer(i) obtained by polymerizing at least one monomer (I) corresponding to:
   (I): an ethylenically unsaturated, linear or branched, aliphatic, cyclic or aromatic monocarboxylic or polycarboxylic acid, or anhydride; and, optionally, a monomer (II) corresponding to:
   II): a polyoxyalkylenated ester of an ethylenically unsaturated carboxylic acid; or obtained from the polymerization of at least one ethylenically unsaturated, linear or branched, aliphatic, cyclic or aromatic, monocarboxylic or polycarboxylic acid, or anhydride; and
(3) a base.

The term "paint" is intended to mean any polymer coating deposited on a substrate and protecting the substrate. That term encompasses aqueous paints, lacquers and varnishes. The terms "lacquers" and "varnishes" have the usual meaning in the targeted technical area. A lacquer generally means a transparent or semi-transparent formulation coated on a wooden substrate to protect the same and having a dry extract of the order of 10% by weight or 40 to 50% by weight if it is a primary or a finishing lacquer respectively.

A varnish is a more concentrated formulation than a lacquer. According to the instant invention, the term "paint" also includes monomers or resins in emulsion like alkyd resins such as glyceropthalic resin, long or short oil modified resins, acrylic resins derived from acrylic or methacrylic acid esters, optionally copolymerised with ethyl acrylate, ethyl-2 hexyl or butyl, acrylic-isocyanate resins, vinyl resins, polyvinyl acetate, polyvinyl chloride, vinyl chloride/vinyl acetate copolymers, vinyl chloride/vinylidene chloride copolymers, aminoplast resins, phenolic resins, polyester resins, polyurethane resins, epoxy resins, silicone resins and cellulose or nitrocellulose resins.

The instant invention may apply to all kinds of aqueous paints coated on all kinds of substrate. That substrate can be wood, metals for car paints, glass, glass used in buildings. Other substrates can be coatings on organic or mineral products to keep their transparency in the domain of visible light. Other substrates may be synthetic or natural fibers and fabrics coated with the resins as cited above.

The invention applies more particularly to lacquers crosslinkable under UV, i.e. lacquers being immediately crosslinked and dried under UV radiation just after having being coated on the substrate, more particularly a wooden substrate.

The terms "aqueous colloidal dispersions of a cerium compound" or "cerium aqueous dispersion" or "cerium sol" mean all systems formed of fine solid particles of a cerium compound having colloidal sizes, in suspension in an aqueous phase. The term particle used in the instant specification encompasses discrete particles or aggregates of particles. Those particles may further comprise residual quantities of ions linked or absorbed like nitrate, acetate or ammonium ions. Colloidal sizes refer to particle sizes of between 1 nm and 500 nm. It should be noticed that in the above defined dispersion, cerium may be utterly in a colloidal form or in the form of ions and colloids at the same time.

The cerium is present in the dispersion generally in the form of oxide and/or hydrated oxide (hydroxide) of cerium. The particles of the cerium dispersion have a size of preferably at most 200 nm, more preferably of at most 100 nm. That size can be of at most 10 nm. These sizes are measured by dynamic light scattering (DLS), optionally completed, if necessary, by small angle x-ray scattering (SAXS) and cryo-transmission electron microscopy (cryo-TEM). A particular cerium compound and the corresponding sols and dispersions thereof, well adapted for the instant invention and for the preparation of suitable aqueous colloidal sols are described in U.S. Pat. No. 5,344,588 whose content is hereby incorporated by reference in the instant specification.

The colloidal dispersions used in the instant invention present specific features. They present an inorganic particle in conjunction with a particular water-soluble or water-dispersible polymer and a base which may be ammoniac or an amine. That polymer interacts with the cerium cation by any kind of link or bond, including coordination, ionic or electrostatic bonds. Thus, the polymer may be present on the particles of the cerium compound and/or inside the particles of cerium and/or in the aqueous phase.

The aqueous paint compositions according to the invention comprise, in the colloidal dispersion of cerium, at least one water-soluble or water-dispersible polymer.

According to a first variant of the invention, the water-soluble or water-dispersible polymer (i) is obtained by the polymerization of at least one monomer (I), the said monomers corresponding to the following:

(I): ethylenically unsaturated, linear or branched, aliphatic, cyclic or aromatic monocarboxylic or polycarboxylic acid, or anhydride.

The monomer (I) corresponds more particularly to the following formula:

$$(R^1)(R^1)-C=C(R^1)-COOH \qquad (I)$$

in which formula the radicals $R^1$, which are identical or different, represent a hydrogen atom, a $C_1$-$C_4$ hydrocarbon radical optionally having a —COOH group, or a —COOH group.

According to a preferred embodiment of the invention, the monomer of formula (I) is a monocarboxylic or polycarboxylic acid, a carboxylic anhydride corresponding to the following formula:

$$(R^{11})HC=C(R^{12})COOH$$

in which formula:
$R^{11}$ represents a hydrogen atom, a —COOH group or a —$(CH_2)_n$—COOH group in which n is between 1 and 4, a $C_1$-$C_4$ alkyl radical;
$R^{12}$ represents a hydrogen atom, a —$(CH_2)_m$—COOH group in which m is between 1 and 4, a $C_1$-$C_4$ alkyl radical.

Preferably, $R^{11}$ represents a hydrogen atom, a group —COOH or $(CH_2)$—COOH, a methyl radical, or an ethyl radical, and $R^{12}$ represents a hydrogen atom, a group —$CH_2COOH$ or a methyl radical.

According to a more specific embodiment, the monomer of formula (I) is chosen from acrylic, methacrylic, citraconic, maleic, fumaric, itaconic or crotonic acids or anhydrides.

A part of monomer (I), for example up to 50% by mole, can be replaced with the following monomers:
neutral hydrophilic monomers such as acrylamide and its derivatives (N-methylacrylamide, N-isopropylacrylamide), methacrylamide, polyethylene glycol methacrylate and polyethylene glycol acrylate;
anionic hydrophilic monomers: sodium 2-acrylamido-2-methylpropanesulphonate (SAMPS), sodium styrenesulphonate and sodium vinylsulphonate.

It is also possible to use small quantities, for example at most 5% by mole of acidic monomers, or their salts such as:
vinylsulfonic acid, 2-propene-1-sulfonic acid, methallylsulfonic acid, sulfopropyl (meth)acrylate, styrenesulfonic acid or acrylamidomethylpropanesulfonic acid,
vinylbenzoic acid,
fumaric acid, itaconic acid, citraconic acid, maleic acid, their salts or their anhydrides,
vinylphosphonic acid.

According to a second variant, the polymer (i) is obtained by polymerization of at least one monomer (I) and at least one monomer (II).

As for the monomer (II), it corresponds more particularly to the following formula:

$$(R^1)(R^1)-C=C(R^3)-C(O)-O-[CH_2CH(R^4)O]_m-[CH(R^5)-CH_2O]_n-R^6$$

in which formula:
the radicals $R^1$, which are identical or different, are as defined above,
$R^3$ is a hydrogen atom or a methyl radical,
$R^4$ and $R^5$, which are identical or different, represent a hydrogen atom or an alkyl radical containing from 1 to 4 carbon atoms,
$R^6$ is an hydrogen atom, alkyl, aryl, alkylaryl or arylalkyl radical containing from 1 to 30, preferably from 1 to 8 carbon atoms,
n is for example between 2 and 100, preferably between 6 and 100,
m is for example between 0 and 50.

Among the monomers of this type, which may be used, there may be mentioned those described in patents EP 705 854, U.S. Pat. No. 4,138,381 or U.S. Pat. No. 4,384,096.

The polymer (i) obtained by reaction of the monomers (I) and (II), is preferably obtained by free-radical polymerization.

The copolymer (i) thus obtained has a "comb" structure with for example a poly acrylate backbone and polyoxyalkylene segments grafted on said backbone.

The comb polymers of the second embodiment of the invention are well known to a person skilled in the art. They can be obtained by various methods, such as, for example, copolymerization of a monomer of anionic type with a nonionic monomer or macromonomer or alternatively by polymerization or a monomer of anionic type, followed by grafting of nonionic chains.

The grafting of the side polymeric segments onto a backbone polymeric segment can be carried out according to conventional techniques familiar to a person skilled in the art (European Polymer Journal, 4, 343 (1968), for example).

Mention may in particular be made, among these conventional techniques, of those referred to as direct grafting and polymerization.

Direct grafting consists in polymerizing the chosen monomer(s) by the radical route in the presence of the polymer selected to form the backbone of the final product. If the monomer/backbone pair and the operating conditions are carefully chosen, then there may be a transfer reaction between the growing macroradical and the backbone. This reaction creates a radical on the backbone and it is from this radical that the graft grows. The primary radical resulting from the initiator can also contribute to the transfer reactions.

For its part, the copolymerization employs, in a first step, the grafting to the end of the nonionic segment of a functional group which can be polymerized by the radical route. This grafting can be carried out by conventional organic chemistry methods. Then, in a second step, the macromonomer thus obtained is polymerized with the monomer chosen to form the backbone and a polymer referred to as a "comb" polymer is obtained.

It is obvious to a person skilled in the art that, when a macromonomer and a monomer, chosen so that these two entities are strongly combined by hydrogen bonds, are polymerized, then there is simultaneously direct grafting to the polymeric segment of the macromonomer and incorporation of this macromonomer in the polymer chain by simple polymerization of its polymerizable end. In this case, the structure obtained is substantially more branched or even crosslinked than in the two preceding cases.

Whatever the method chosen, the polymerization and the grafting preferably take place in the aqueous phase.

In addition, it is advantageously carried out in the presence of a polymerization initiator, preferably a water-soluble polymerization initiator. The latter can be chosen in particular from peroxides, such as alkali metal or ammonium persulfates, azobis(cyanovaleric acid), azobis(methylpropionamide hydrochloride), and the like.

It is specified that the molecular mass of the polymer as well as the respective proportions of the monomers (I), and (II), depending on their presence, are such that the resulting polymer does not precipitate when it is in an aqueous solution.

More particularly, the monomer (I) is chosen from acrylic, methacrylic, citraconic, maleic, fumaric, itaconic and crotonic acids or anhydrides and, generally speaking, has the same definition as the one given above for the polymer (i) of the first variant.

The polymers (i) may, in addition, comprise small quantities, for example at most 10% by mole, of units corresponding to monoethylenically unsaturated nonionic monomers (III).

Among the monoethylenically unsaturated nonionic monomers (III), there may be mentioned:
vinylaromatic monomers such as styrene, vinyltoluene,
$C_1$-$C_{20}$ alkyl esters of acids which are α-β-ethylenically unsaturated, such as methyl, ethyl or butyl acrylates or methacrylates,
vinyl or allyl esters of acids which are α-β-ethylenically unsaturated, such as vinyl or allyl acetates or propionates,
vinyl or vinylidene halides such as vinyl or vinylidene chloride,
α-β-ethylenically unsaturated nitriles such as acrylonitrile,
hydroxyalkyl esters of acids which are α-β-ethylenically unsaturated, such as hydroxyethyl or hydroxypropyl acrylates or methacrylates,
α-β-ethylenically unsaturated amides such as acrylamide or methacrylamide.

If such monomers are present, the polymerization takes place in their presence and their quantity and nature are selected in order to obtain a resulting copolymer soluble or dispersible in water.

According to a particular embodiment of the instant invention, an organic acid or the salt thereof is added to the cerium dispersion together with the water-soluble or water-dispersible polymer. Usable organic acids or the salts thereof are those taught by WO 03/099942 cited above, whose content is hereby incorporated by reference in the instant specification. These suitable acids have at least three acid functions per molecule and the third pK is of at most equal to 10. Citric acid is particularly suitable.

The molar ratio between the total acid moles of the water-soluble or water-dispersible polymer and, optionally, the organic acid, and the moles of total cerium atoms may vary in a wide range and is more particularly of between 0.001 and 5.0, more preferably between 0.1 and 1.5. The total cerium atoms includes surface cerium atoms and the atoms within the bulk of the particle not exposed to the surface. That ratio depends upon the size of the particles in the dispersion, the ratio having a smaller value when the particle size increases.

The aqueous paint further comprises a base (3) which can be any chemically basic compound compatible with the paint composition. The base (3) is added to increase and/or to adjust the pH of the paint composition. It can be aqueous ammonia but also an amine. For example, the base (3) can be any type of amine, primary, secondary or tertiary. It will be noted that it is possible to use aminoalcohols, such as, for example, 2-amino-2-methyl-1-propanol.

The aqueous paint composition of the invention presents a pH of between 5 and 14, preferably 7 and 9, when there is no monomer (II) in the polymer (i) and/or when there is an organic acid or the salt thereof having at least three acid functions per molecule and whose third pK is of at most equal to 10.

The aqueous paint composition of the invention presents a pH which may vary between 1 and 14, when there is a monomer (II) copolymerized with monomer (I) in the polymer (i).

The preparation of the aqueous paint composition comprises the step of mixing the colloidal dispersion with the paint, more particularly the lacquer or varnish, and the base.

According to the first variant of the instant invention, more particularly when the water-soluble or water-dispersible polymer is for example a polyacrylic acid polymer with or without the organic acid, for example citric acid, it is recommended to carry out the preparation of the paint composition as follows:
a) in a first step, the polyacrylic acid polymer with or without the organic acid is added to the starting cerium sol or dispersion with the pH of the resulting mixture being acidic, more particularly around 1-2. A precipitation of the cerium compounds appears.
b) in a second step, the precipitate obtained is solubilized by adding a base to the precipitate in order to raise the pH to above 5, preferably around 7 or above. At that point, the precipitate dissolves and a clear dispersion of the cerium compound is obtained.
c) in a third step the paint is added to the dispersion obtained in step b) resulting in an aqueous paint composition stable and which does not become colored upon storage.

The same process can be used for the second variant of the instant invention, when the water-soluble or water-dispersible polymer is for example a polyacrylic acid/polyoxyalkene copolymer with or without the organic acid. However, that second variant with or without the use of the organic acid, provides most of the time the further advantage that no precipitation occurs during step a), more particularly when the polyacrylic backbone of the copolymer is small. The pH of the composition so obtained can be varied between pH 1 and pH 14. The aqueous paint composition so obtained is also stable upon storage.

The quantity of dispersion added to the paint depends upon the final rate of cerium oxide wanted in the composition. That rate can vary a great extent. It is possible to use relatively large quantities of cerium without hampering the water resistance or the mechanical strength of the paint. Generally the added colloidal dispersion has a quantity by weight of cerium oxide of at most 25%, preferably of at most than 50% and even more preferably of at most 3% based on the total weight of the composition. Such a quantity is sufficient to obtain paint, a lacquer, or a varnish providing a good protection to the substrate, for example wood, against UV during a long period of time.

The following examples further illustrate the invention, reference is made to the accompanying drawing, wherein.

EXAMPLE 1

This example relates to the preparation of a composition of a colloidal dispersion of cerium stabilized by complexation with poly(acrylic acid) (PAA). There is a significant improvement in color and degradative stability in the presence of UV/ambient light thereof, as benchmarked against the complexes with citric acid.

A precipitation-redispersion (P-R) process is central to complexation of the cationic ceria with PAA to extend the range of pH stability. Poly(acrylic acid) of weight average molar mass 2000 g/mol corresponding to a degree of polymerization of 28 acrylic acid monomers and a polydispersity of 1.74 may be used. The cerium oxide nanoparticle sol is prepared following the process according to Example 1 of U.S. Pat. No. 5,344,588 hereby cited as a reference and diluted with demineralised water to give a 50 g/L dispersion in water at pH 1.5. This dispersion is further diluted in pH 1.5 nitric acid to a concentration of 10 g/l. A similar concentration (10 g/L) solution of PAA in nitric acid at the same pH (=1.5) is also prepared.

An equal volume of cerium oxide sol (pH 1.5; 10 g/L) is slowly added to the PAA solution (pH 1.5; 10 g/L) at a dose rate of 2 mL/min with stirring at 200-300 rpm. As with citric acid the solution becomes cloudy leading to the formation of a precipitate which quickly settles to the bottom if the mixing is stopped. The suspension is further stirred and homogenized for 60 minutes. The mass ratio $X=Mass_{particles}/Mass_{polymer}=1$ is used for this composition. The suspension is then centrifuged at 15000 rpm for 15 min and the supernatant is decanted to give a whitish-yellow precipitate. An aliquot of aqueous ammonium hydroxide solution at a concentration of 5M is then slowly added over the precipitate and gently shaken on an orbital shaker for approximately 30 min. The precipitate redissolves at the elevated pH giving a relatively concentrated dispersion of cerium oxide nanoparticles coated with PAA. The aqueous ammonium hydroxide solution added is sufficient (approximately 0.25 g per g of precipitate) to give a final redispersed solution of particles at a final pH of 10.

Light scattering results show the size of the redispersed particles to be a monodisperse colloidal dispersion of 13-18 nm. The final concentration of the composition is 175 g/L. The sol contains stabilized particles complexed with PAA, free PAA, free nitrate ions and ammonium ions.

It is immediately observed that the redispersed sol is lighter yellow in color when compared to citric acid complexes obtained according to protocols similar to the description in WO 03/099942 which is amber in color. The $CeO_2$-citric acid complexes are available as 208 g/L, pH 9 sols.

Figure 1:
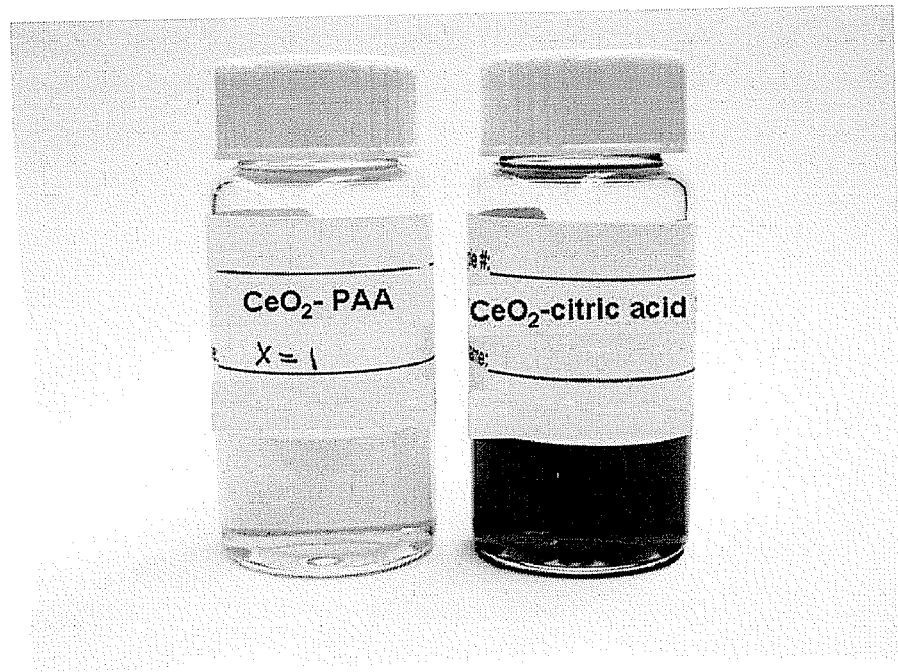
FIG. 1 shows a comparison in color of two vials of cerium dispersion with and without polyacrylic acid.

Stability of Color in Ambient Light:

Further it is also observed that exposure of the colloidal cerium complexed with citric acid to ambient light stored on the benchtop results in significant change in color from amber to dark brown over a period of approximately one month. The solution of citric acid complexed cerium oxide nanoparticles, thus may not be stored in ambient light. The complexes of colloidal cerium with PAA on the other hand remain largely unperturbed. A self evident comparison in color is highlighted in FIG. 1 below, wherein the left vial with concentrated $CeO_2$-PAA(2K) sol (175 g/L; pH 10) prepared by P-R at X=1 [PAA]=1%, has overt differences in color when compared to the right vial with $CeO_2$-citric acid sol (200 g/L; pH 9) stored in ambient light on the benchtop for 1 month.

Figure 2:
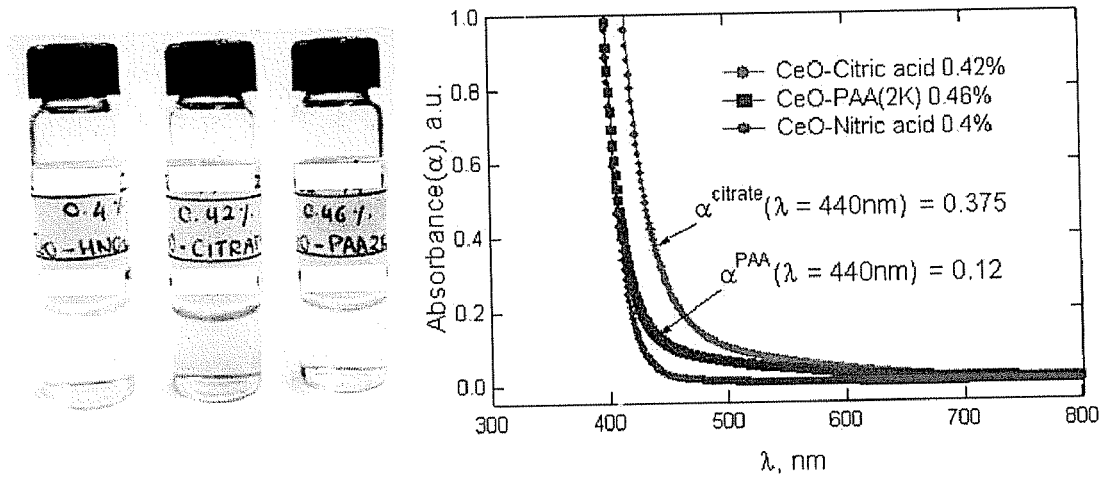
FIG. 2 shows coloration of vials with complexation of a diluted ceria-nitrate nanosol and a complex with citric acid, and the chart shows UV-Vis absorption spectra of ceria complexes with equivalent nominal concentrations of Ceria.

Dilutions of such complexes investigated by UV-Vis spectroscopy suggest that differences in surface complexation apparently changes the UV-Vis absorption spectra in a significant fashion. The absorbance in the blue region ($\lambda=440$) for $CeO_2$-citrate (=0.375) stored in ambient light is higher than $CeO_2$-PAA (=0.12) by a factor of 3 and as shown in FIG. 2 below. It shows a comparison of coloration with complexation between a diluted ceria-nitrate nanosol (pH 1.5)(left vial), a complex with citric acid, and ceria complexed with PAA(2K) (pH 10) (right vial). Significant yellowing of ceria is observed with citric acid. The plot in FIG. 2 shows UV-Vis absorption spectra of ceria complexes with equivalent nominal concentrations of Ceria. All concentrations are percent mass fractions of the cerium oxide alone Stability in Laser Light:

Instead of a broad spectrum of wavelengths in ambient light, similarly prepared cerium oxide nanoparticle complexes with PAA and with citric acid, are diluted and compared exposed to a low intensity laser beam at a specific wavelength ($\lambda=488$ nm; Blue). Though the initial color of an unexposed PAA and citric acid complex is similar, fresh $CeO_2$-citric acid sol (208 g/L; pH 9) starts discoloring rapidly on exposure to the laser beam and eventually precipitates at long exposure times as shown on FIG. 3 below. The cerium oxide-PAA complexes are stable indefinitely.

Figure 3:
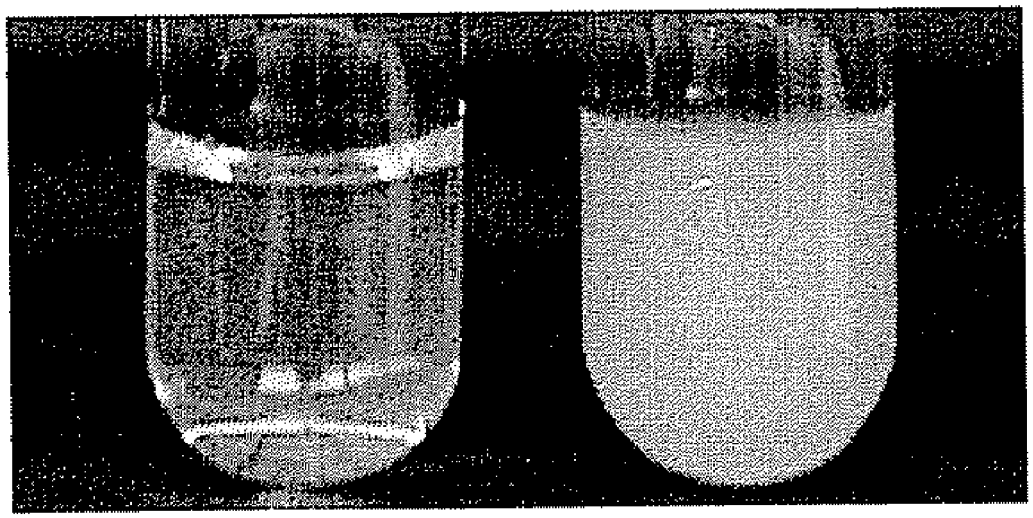
FIG. 3 illustrates comparative stability of $CeO_2$ complexes on exposure to laser light.

FIG. 3 illustrates comparative stability of $CeO_2$ complexes on exposure to laser light for 3.5 Hrs. ($\lambda=488$ nm, 60 mW). $CeO_2$-citric acid sol (208 g/L; pH 9) (right vial), destabilizes and precipitates in the laser beam compared to $CeO_2$-PAA that remains stable and clear (left vial). $[CeO_2]=20$ g/L; pH ~7; $[NaNO_3]=0.75$ N.

EXAMPLE 2

This example relates to the preparation of a composition of a colloidal dispersion of cerium nanoparticles stabilized by complexation with "comb polymers" comprising of a short anionic PAA backbone and neutral poly(ethylene oxide) (PEO) pendant side chains. Two kinds of comb polymers are used for the purpose, henceforth designated as $PAA-PEO_1$ and $PAA-PEO_2$, the composition of which is gathered in TABLE 1 below.

TABLE 1

| Comb Polymer | Molar mass PAA backbone (g/mol) | Molar mass PEO sidechains (g/mol) | Avg. Number of PEO sidechains per molecule |
|---|---|---|---|
| $PAA-PEO_1$ | 2400 | 1000 | 24 |
| $PAA-PEO_2$ | 7100 | 1000 | 12 |

The complexes with Cerium particles are made by simple mixing with these two polymers for different ratios $X=Mass_{particles}/Mass_{polymer}$ at pH 1.5 and a total solid concentration of 0.2% by wt. Then the pH of the solution is subsequently increased up to pH 10 by addition of ammonium hydroxide solution.

Complexation of $PAA-PEO_1$ (lower molar mass PAA backbone) at pH 1.5 resulted in clear transparent solutions with no visually observable turbidity for X>0.1. Turbid solutions are observed for a large excess of $PAA-PEO_1$. Increasing the pH with $NH_4OH$ up to 10, the solutions are clear and transparent except at X=1.6. The size of the nanoparticles obtained by DLS and turbidity at different X at pH 1.5 and pH 10 is gathered in TABLE 2 below.

TABLE 2

| | $PAA-PEO_1$ | | | |
|---|---|---|---|---|
| X | Particle size (nm) pH 1.5 | Physical state pH 1.5 | Particle size (nm) pH 10 | Physical state pH 10 |
| 0.01 | — | Precipitate | 149 | Clear sol |
| 0.1 | — | Precipitate | 84 | Clear sol |
| 0.2 | 52 | Clear sol | 62 | Clear sol |
| 0.4 | 28 | Clear sol | 29 | Clear sol |
| 0.8 | 26 | Clear sol | 22 | Clear sol |
| 1.6 | 38 | Clear sol | — | Turbid |

The hydrodynamic diameter measurements by DLS and corresponding to the complexation between cerium nanoparticles and PAA-PEO$_2$ are gathered in TABLE 3, below. The PAA-PEO$_2$ polymer comb is mainly made of PAA backbone with complexation characteristics similar to those observed with PAA homopolymer. At pH 1.5, a precipitation occurs except for X>0.8 (corresponding to 26 PAA-PEO$_2$ molecules per particle). Adding ammonia solution, the turbid mixture redisperses gives clear solutions made of aggregates from 50 nm to 140 nm as a function of X.

The obtained data are gathered in table 3:

TABLE 3

PAA-PEO$_2$

| X | Particle size (nm) pH 1.5 | Physical state pH 1.5 | Particle size (nm) pH 10 | Physical state pH 10 |
|---|---|---|---|---|
| 0.01 | — | Precipitate | 133 | Clear sol |
| 0.1 | — | Precipitate | 94 | Clear sol |
| 0.2 | — | Precipitate | 107 | Clear sol |
| 0.4 | — | Precipitate | 80 | Clear sol |
| 0.8 | 57 | Clear sol | 48 | Clear sol |
| 1.6 | 50 | Clear sol | — | Turbid |

It appears from above table 3 that in spite of their large size these complexes are stable two months after their complexation and exhibit a clear amber coloration. These complexes also appear to be stable to degradation in color on exposure to ambient light over time or intense laser beams.

Complexation with PAA-PEO combs with a short PAA backbone (PAA-PEO$_1$) results in dispersions of single nanoparticle with a neutral PEO corona. This offers additional critical processing advantages in completely bypassing the need for precipitation-redispersion that is critical for polyfunctional acids alone.

The invention claimed is:

1. An aqueous paint composition comprising a mixture of:
   (1) an aqueous paint;
   (2) a colloidal dispersion of a cerium compound comprising a water-soluble or water-dispersible polymer (i) in complexation with cerium and obtained by polymerizing at least one monomer (I) corresponding to:
   (I): an ethylenically unsaturated, linear or branched, aliphatic, cyclic or aromatic monocarboxylic or polycarboxylic acid, or anhydride; and, optionally, a monomer (II) corresponding to:
   (II): a polyoxyalkylenated ester of an ethylenically unsaturated carboxylic acid; or obtained from the polymerization of at least one ethylenically unsaturated, linear or branched, aliphatic, cyclic or aromatic, monocarboxylic or polycarboxylic acid, or anhydride; and
   (3) a base.

2. The composition according to claim 1, wherein the colloidal dispersion (2) further comprises an organic acid or the salt thereof having at least three acid functions per molecule and whose third pK is of at most equal to 10.

3. The composition according to claim 2, wherein the organic acid is citric acid.

4. The composition according to any of the preceding claims, wherein the polymer (i) is derived from the polymerization:
of at least one monomer of formula (I):

$$(R^1)(R^1)\!-\!C\!=\!C(R^1)\!-\!COOH \qquad (I)$$

in which formula:
the radicals $R^1$, which are identical or different, represent a hydrogen atom, a $C_1$-$C_4$ hydrocarbon radical optionally comprising in complexation with and, optionally of at least one monomer of formula (II):

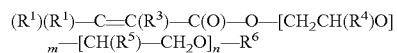

in which formula:
the radicals $R^1$, which are identical or different, are as defined above,
$R^3$ is a hydrogen atom or a methyl radical,
$R^4$ and $R^5$, which are identical or different, represent a hydrogen atom or an alkyl radical containing from 1 to 4 carbon atoms,
$R^6$ is an hydrogen atom, alkyl, aryl, alkylaryl or arylalkyl radical containing from 1 to 30,
n is between 2 and 100, and m is between 0 and 50.

5. The composition according to claim 1, wherein the monomer (I) of the polymer (i) is a monocarboxylic or polycarboxylic acid, or a carboxylic anhydride, corresponding to the following formula:

$$(R^{11})HC\!=\!C(R^{12})COOH$$

wherein:
$R^{11}$ represents a hydrogen atom, a —COOH group or a group —$(CH_2)_n$—COOH in which n is between 1 and 4, a $C_1$-$C_4$ alkyl radical; $R^{12}$ represents a hydrogen atom, a group —$(CH_2)_m$—COOH in which m is between 1 and 4, a $C_1$-$C_4$ alkyl radical.

6. The composition according to claim 5, wherein the polymer (i) is derived from the polymerization:
of at least one monomer of formula (I):

$$(R^1)(R^1)\!-\!C\!=\!C(R^1)\!-\!COOH \qquad (I)$$

in which formula the radicals $R^1$, which are identical or different, represent a hydrogen atom, methyl, ethyl, optionally having a —COOH group, or a —COOH group.

7. The composition according to claim 6, wherein the monomer (I) of the polymer (i) is such that the radical $R^{11}$ represents a hydrogen atom, a group —COOH or —$(CH_2)$—COOH, a methyl radical, an ethyl radical, and the radical $R^{12}$ represents a hydrogen atom, a group —$CH_2$—COOH or a methyl radical.

8. The composition according to claim 1, wherein the monomer (I) of the polymer (i) further contains acrylamide, (N-methylacrylamide, N-isopropylacrylamide), methacrylamide, polyethylene glycol methacrylate, polyethylene glycol acrylate, sodium 2-acrylamido-2-methylpropanesulfonate (SAMPS), sodium styrenesulfonate or sodium vinylsulfonate.

9. The composition according to claim 1, wherein the monomer (I) of the polymer (i) is acrylic, methacrylic, citraconic, maleic, fumaric, itaconic or crotonic acid or the anhydrides thereof.

10. The composition according to claim 1, wherein the monomer (I) is partially replaced with (III) a vinylaromatic monomer, a $C_1$-$C_{20}$ alkyl ester of an α-β-ethylenically unsaturated acid, a vinyl or allyl ester of an α-β-ethylenically unsaturated acid, a vinyl or vinylidene halide, an α-β-ethylenically unsaturated nitrile, a hydroxyalkyl ester of an α-β-ethylenically unsaturated acid, or an α-β-ethylenically unsaturated amide.

11. The composition according to claim 10, wherein the monomer (III) is styrene, vinyltoluene, methyl, ethyl or butyl acrylate or methacrylate, vinyl or allyl acetate or propionate, vinyl or vinylidene chloride, acrylonitrile, hydroxyethyl or hydroxypropyl acrylates or methacrylates, acrylathide or methacrylamide.

12. The composition according to claim 1, wherein the polymer (i) is derived from the polymerization of maleic anhydride.

13. The composition according to claim 1, wherein the base (3) is ammoniac or an amine.

14. The composition according to claim 1, wherein the paint is a lacquer crosslinkable under UV radiation.

15. The composition according to claim 1, having a pH of between 5 and 14, when there is no monomer (II) in the polymer (i).

16. The composition according to claim 1, having a pH of between 1 and 14, when the polymer (i) derived from a monomer (I) copolymerized with a monomer (II).

17. The composition according to claim 2, having a pH of between 5 and 14, when said composition further comprises an organic acid or the salt thereof having at least three acid functions per molecule and whose third pK is of at most equal to 10.

18. The composition according to claim 1, wherein the molar ratio between the acid moles of the water-soluble or water-dispersible polymer and the moles of total cerium atoms of the dispersion is of between 0.001 and 5.0.

19. The composition according to claim 18, wherein the molar ratio, is of between 0.1 and 1.5.

20. The composition according to claim 1, wherein the particle size of the colloidal dispersion is of at most 200 nm.

21. The composition according to claim 19, wherein the particle size of the colloidal dispersion is of at most 10 nm.

22. A process for the preparation of an aqueous paint composition as defined in claim 1, comprising the step of mixing the colloidal dispersion with the paint and the base.

23. The process according to claim 22, wherein the dispersion is added to the paint in order to provide a quantity by weight of cerium oxide of at most 50% based on the total weight of the composition.

* * * * *